C. GODFREY.
Apparatus for Evaporating Saccharine and other Liquids.
No. 155,647.
Patented Oct. 6, 1874.
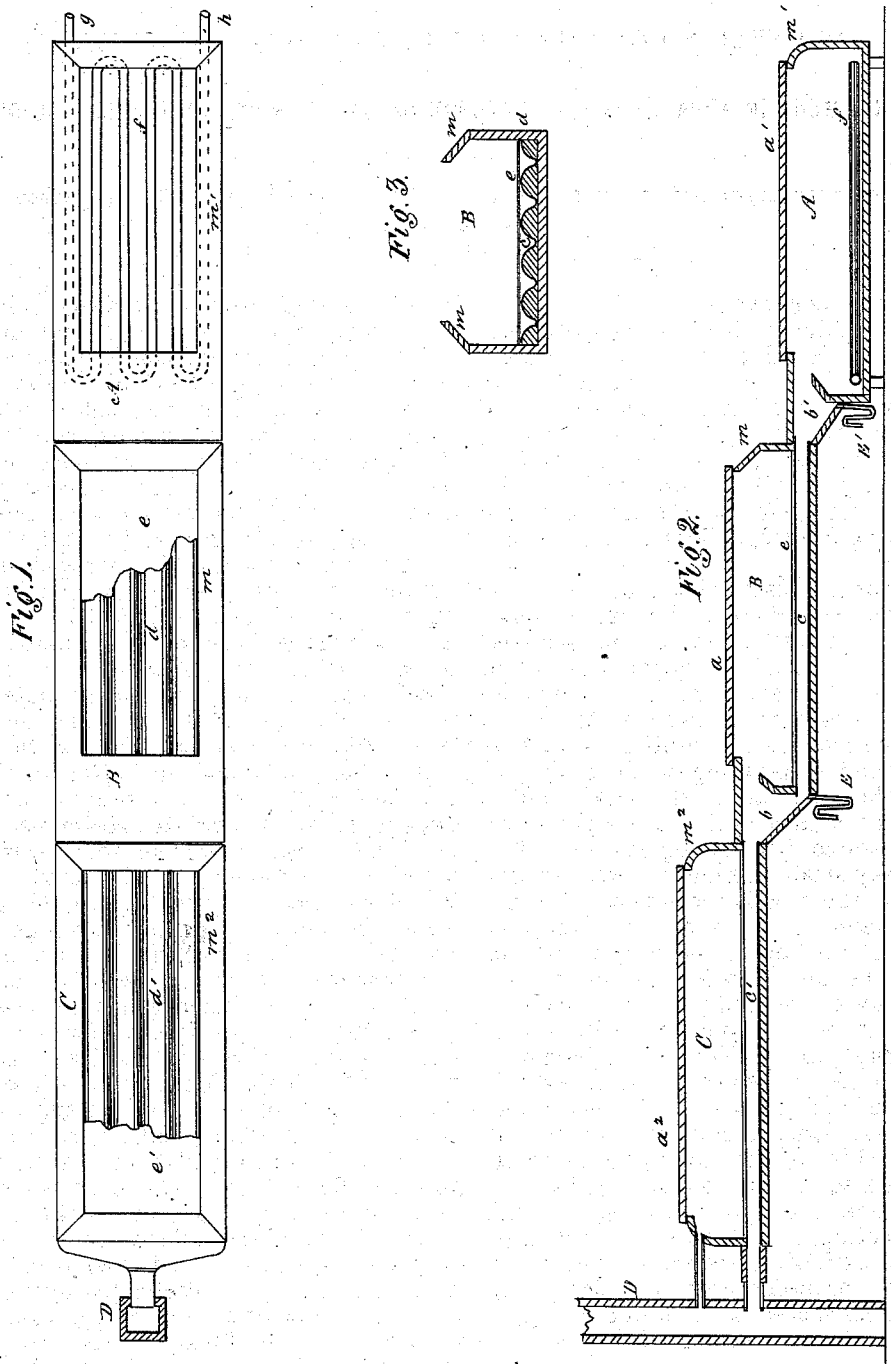
Witnesses:
Alonzo P. Smith
Whm S. Thornton
Inventor:
Cornelius Godfrey

UNITED STATES PATENT OFFICE.

CORNELIUS GODFREY, OF HUNTINGTON, NEW YORK.

IMPROVEMENT IN APPARATUS FOR EVAPORATING SACCHARINE AND OTHER LIQUIDS.

Specification forming part of Letters Patent No. 155,647, dated October 6, 1874; application filed March 19, 1874.

*To all whom it may concern:*

Be it known that I, CORNELIUS GODFREY, of the town of Huntington, county of Suffolk and State of New York, have invented certain new and useful Improvements in Apparatus for Evaporating the Juice of Sugar-Cane and other Liquids; and I hereby declare the following to be a full, clear, and exact description thereof, reference being had to the accompanying drawing, making a part of this specification.

This invention relates to certain improvements in the construction and arrangement of evaporating-pans for evaporating and concentrating the juice of the sugar-cane, in the manufacture of sugar, and other liquids, whereby the steam, which is generated in one pan in the process of evaporation, is utilized for heating and evaporating the juice or liquid placed in the next pan of the series, and a large amount of juice or liquid is evaporated and concentrated by the expenditure of a comparatively small amount of fuel. It consists, first, in the peculiar construction of the pan which receives the steam from the preceding pan of the series, and supplies steam for heating the juice placed in the succeeding pan of the series; secondly, in the combination of one or more of such pans with a pan, heated through the medium of a steam-coil, with steam from an ordinary boiler, and another pan, which forms the last of the series, provided with pipes, connecting with an upright flue or chimney, for conveying away the steam generated in this last-mentioned pan, and the residue, if any, of the steam not condensed in heating it; and, thirdly, in a device, hereinafter described, operating in connection with the pans, for discharging the steam which may become condensed in the steam-passages through which it is conducted for heating the pans.

In the drawings, Figure 1 represents a plan view of a series of evaporating-pans constructed and arranged in accordance with my invention. Fig. 2 is a vertical longitudinal section of the same, and Fig. 3 a transverse vertical section of one of the pans.

Similar letters of reference indicate like parts in all the figures.

B represents my improved evaporating-pan for receiving the steam wherewith to heat the liquid placed therein, from the pan nearer to the boiler, and transmitting the steam generated in evaporating said liquid to the pan adjoining it farther from the boiler. This pan B is of wood, and is provided with a tight-fitting cover or lid, $a$, of the same material. The main body of the pan is rectangular in form, and at the end farthest from the boiler is a recess or steam-chamber, $b$, into which the steam generated in the pan passes. Extending the entire length of this pan is a series of steam-passages, $c$, which are formed by a corrugated plate of sheet metal, $d$, laid on the bottom of the pan, and a plate of plain sheet metal, $e$, which rests on the plate $d$, and forms the bottom of the pan when in operation. The vacant spaces between the under side of the plate $d$ and the bottom of the pan may be filled in with any suitable non-conducting material; and the steam-passages $c$ are formed with as large an upper surface as practicable, in order that the latent heat of the steam may be given off to the plate $e$ while the steam is passing through them. The boiler is not shown in the drawing, as it does not form part of my invention, and may be of any of the kinds commonly used for generating steam. A is the first pan of the series, or that which is heated by steam from the boiler. This is similar in form to the pan B, being made of wood, and having a tight-fitting lid or cover, $a^1$, and a steam chamber or recess, $b'$; but instead of having the steam-passages formed by means of a corrugated sheet-metal plate, it may be provided with a steam-coil, $f$, through which the steam from the boiler circulates, it being admitted by an induction-pipe, $g$, and discharged by the eduction-pipe $h$, which may be arranged to conduct the steam back to the boiler. In lieu of this steam-coil $f$, however, steam-passages may be formed by a corrugated plate of metal, and a plain sheet of metal laid thereon, as in the pan B; but these passages in this case, instead of independently extending the entire length of the pan, will be connected at their ends, so that the steam being admitted thereinto will circulate through the entire series, and be discharged therefrom by the eduction-pipe $h$. C is the last pan of the series, which may also be of wood, and is provided with a series of steam-passages, $c'$, extending the entire length thereof, and formed by means of a corrugated plate, $d'$, and a plain plate, $e'$, similar to those in the pan B, and it is likewise provided with a tight-fitting cover or lid, $a^2$. This pan C also has a steam chamber or recess; but the steam generated therein is conducted directly, by means of pipes or other connection, with an upright flue or chimney, D; and such portion of the steam as is not condensed in the steam-passages $c'$ is also conducted in a similar manner into the said flue D. E is a bent pipe or tube, open at both ends, its upper end being flush with the lowest part of the recess $b$, and is for the purpose of carrying off the steam which may become condensed in the steam-passages $c'$ of the pan C. The lower bend of this pipe being filled with water will prevent the steam escaping through said pipe. E' is a similar pipe, located in the recess $b'$ of the pan A.

In Figs. 1 and 3 the lids $a^1\ a^1\ a^2$ are removed. $m\ m^1\ m^2$ are flanges, formed upon the upper edges of the pans, or they may be formed on the covers or lids, and are for the purpose of preventing the liquid, which rises during ebullition, from being thrown out of the pans, for which purpose they are curved or inclined inwardly, so that the liquid thrown against them will rebound toward the center of the pan.

The operation is as follows: The liquid to be evaporated, having been placed in the pans A, B, and C, steam is admitted into the steam-coil $f$, and when the liquid in the pan A has been brought to the boiling-point, the steam generated therein passes into the recess $b'$, and from thence into the steam-passages $c$ of the pan B, and gives off its latent heat for heating the liquid in the said pan B. In like manner the liquid in the pan B, having been raised to the boiling-point, the steam generated therefrom passes through the recess $b$ into the steam-passages of the pan C, for heating the liquid therein. The steam generated in the said pan C (the last of the series) passes into the upright flue or chimney D, as does also such portion of the steam from the steam-passages $c'$ as may not be condensed therein, thereby creating a draft in the flue or chimney. Such portions of the steam as become condensed in the steam-passages $c$ and $c'$ pass off by the waste-pipes E and E', respectively. Two or more of the pans B may be used in connection with a pan, A, at one end of the series, and a pan, C, at the other end.

By means of this construction and arrangement of the pans, the latent heat of the steam generated therein is utilized to the greatest practicable extent, and the apparatus may be constructed at a comparatively small cost, and erected in localities in which skilled labor is difficult to obtain; and another advantage of my invention is, that the liquid can be evaporated and concentrated at comparatively low temperatures, as the temperature in any of the pans will never exceed 212° Fahrenheit.

What I claim as my invention is—

1. The pan B, provided with the steam-passages $c$, formed by the plates $d$ and $e$, and a steam-chamber, $b$, as herein shown and described, for the purposes set forth.

2. The combination of the pans A, B, and C, each constructed, as described, and arranged to operate in the manner set forth.

3. The waste-pipe E, constructed as described, and located in the steam-chamber $b$ of the pan B, in combination with the steam-passages $c'$ of the pan C, for the purpose specified.

CORNELIUS GODFREY.

Witnesses:
A. P. SMITH,
JOHN S. THORNTON.